United States Patent
Tokumaru

(10) Patent No.: US 8,314,964 B2
(45) Date of Patent: Nov. 20, 2012

(54) IMAGE PROCESSING APPARATUS AND IMAGE PROCESSING METHOD

(75) Inventor: Akiko Tokumaru, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 395 days.

(21) Appl. No.: 12/699,433

(22) Filed: Feb. 3, 2010

(65) Prior Publication Data
US 2010/0195152 A1 Aug. 5, 2010

(30) Foreign Application Priority Data
Feb. 3, 2009 (JP) ................ 2009-022317

(51) Int. Cl.
*G06F 15/00* (2006.01)
*G06K 1/00* (2006.01)

(52) U.S. Cl. ....... 358/1.15; 358/1.9; 358/1.13; 358/1.14

(58) Field of Classification Search ............... None
See application file for complete search history.

(56) References Cited

U.S. PATENT DOCUMENTS
2004/0223197 A1 11/2004 Ohta

FOREIGN PATENT DOCUMENTS
JP 2004-246577 A 9/2004
JP 2006-243830 A 9/2006

*Primary Examiner* — Thierry Pham
(74) *Attorney, Agent, or Firm* — Canon USA Inc. IP Division

(57) ABSTRACT

If a position where a previous operator added information and a position where a next operator added information overlap each other with respect to a document, an image processing apparatus notifies the previous operator that information has been added by the subsequent operator, and also notifies the previous operator where the information has been added and the operator that added the information.

15 Claims, 15 Drawing Sheets

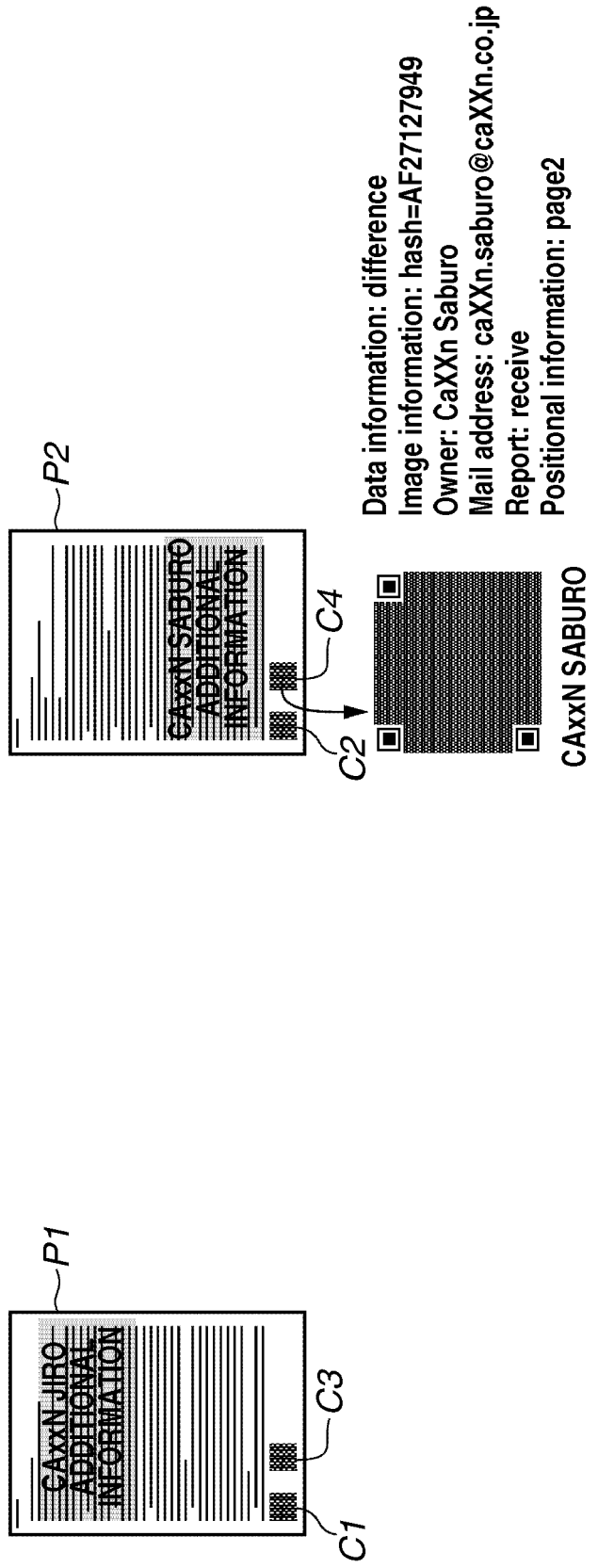

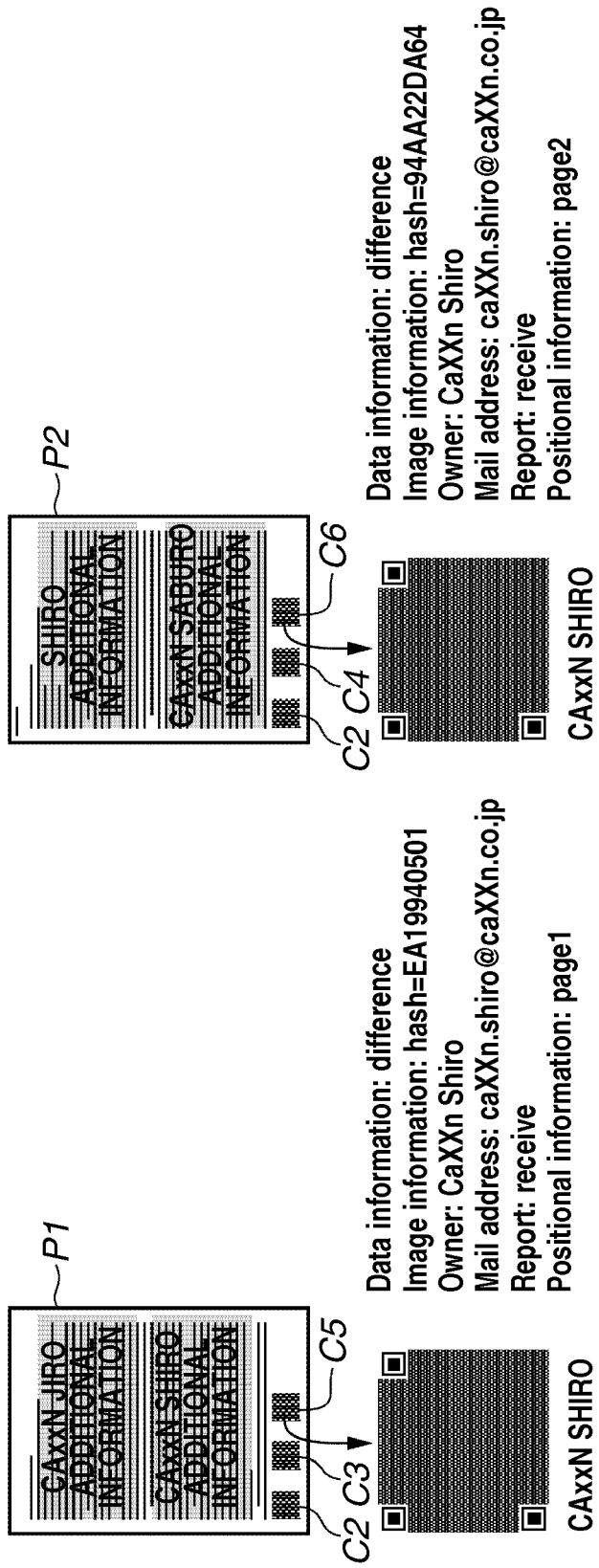

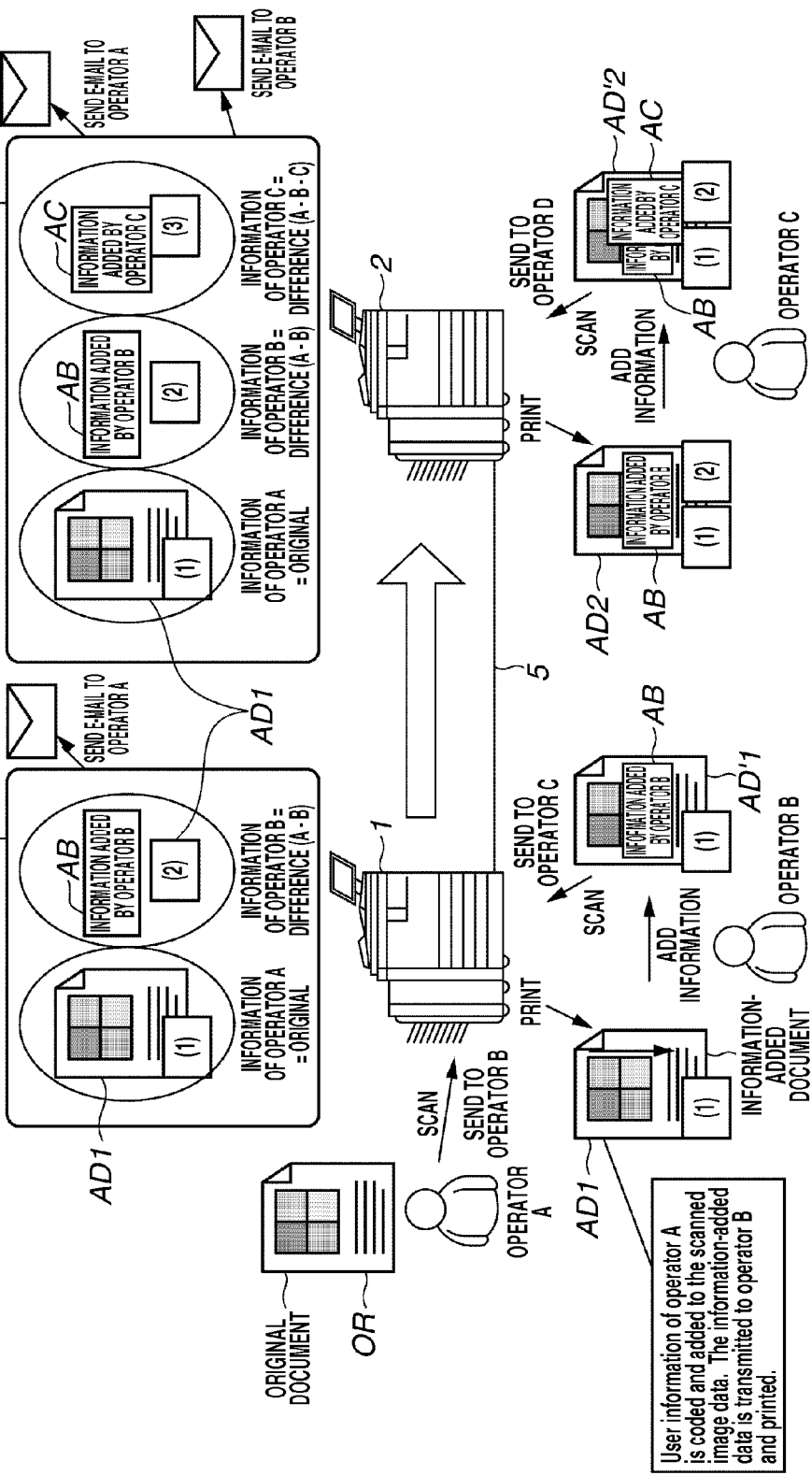

IMAGE PROCESSING APPARATUS AND IMAGE PROCESSING METHOD

BACKGROUND OF THE INVENTION

1. Field of the Invention

The present invention relates to an image processing apparatus useful for supporting a revision workflow which allows a plurality of operators to add information to a document to be printed and revise the document.

2. Description of the Related Art

Conventionally, a number of workflow systems that support processing of a document such as a form when the document is circulated to a plurality of processing persons in an office are being developed.

If the circulated document is in electronic data, the processing person can revise the electronic data on a screen of a personal computer (PC). If the electronic data is revised on a PC, since the history of the person who made the revision and the revised portion remains, it is easy to track the revision data from the history information.

However, since a document using a paper medium is easier-to-see and easier-to-handle for the processing persons compared to electronic data, even if a processing person receives the document in electronic data, in some cases, the person prints the document on a paper medium and manually adds information to the paper medium or correct the data printed on the paper medium. In such a case, it is necessary to extract difference information, which is the information manually added to the paper medium, and manage the difference information in association with the original data.

Japanese Patent Application Laid-Open No. 2004-246577 discusses a method for extracting information added to data by comparing the original data with the information-added data, and synthesizing the difference information with the original data. Japanese Patent Application Laid-Open No. 2004-246577 also discusses a method for determining a portion where the difference is determined with respect to the original document by vectorizing the extracted difference information.

In a case where a paper medium with the synthesized difference information is passed on to operators one after another, there may be a case where it is desirable to change processing from the predetermined workflow depending on the difference information.

An example of such a case is where processing is changed according to content of a form. If the processing of the form is to be changed according to its content, it is useful to use a system that embeds workflow information in a paper medium being a medium of the original data, and change the configuration of the workflow when additional information is added to the paper medium. Such a system is discussed in Japanese Patent Application Laid-Open No. 2006-243830.

However, if the circulated document is a specification sheet or a manual, many people will be involved in the task of the revision. In such a case, since paper is easier-to-see and easier-to-handle, it is easily assumed that a person that received the document in electronic data prints the document, manually corrects it, and passes the document on to the next person.

If the system discussed in Japanese Patent Application Laid-Open No. 2004-246577 or Japanese Patent Application Laid-Open No. 2006-243830 is adopted and such revision workflow is applied, however, the problem described below may occur.

According to the method discussed in Japanese Patent Application Laid-Open No. 2004-246577, original information is embedded in advance. When the first processing person prints, adds information, and scans the document, the image processing apparatus compares the input image and the original image. Then, the first processing person passes the scan data on to the second processing person. The second processing person adds information and passes the data on to the third processing person in a similar manner, and this process is repeated. In this case, the extracted difference information includes not only the information added by the previous processing person but also the information added by the first processing person. In other words, the extracted information is always the difference between the original data and the input image. Thus, difference information generated by each processing person cannot be extracted.

Further, according to the method discussed in Japanese Patent Application Laid-Open No. 2006-243830, the workflow is changed according to what the processing person has written and not where the processing person has written. Thus, even if a difference is generated by a plurality of processing persons at a same area, the workflow is not changed.

Consequently, when a document is revised by workflow processing according to the system discussed in Japanese Patent Application Laid-Open No. 2004-246577 or Japanese Patent Application Laid-Open No. 2006-243830, after a processing person added information to a certain area, even if another processing person makes revision to the same area, it is not possible to know the fact that information has been added to the document and the content of the information which has been added.

SUMMARY OF THE INVENTION

According to an aspect of the present invention, an image processing apparatus having a reading unit for reading and processing an original document or an information-added document based on the original document and having information added by each operator includes an authentication unit configured to authenticate a user that instructs reading of the original document or the information-added document to the reading unit, a decoding unit configured to decode additional information added to the information-added document read by the reading unit, an extraction unit configured to extract image data of the original document, user information of a user who added information to the original document or the information-added document, and position information used for determining a position where information is added to the original document from the additional information decoded by the decoding unit, a generation unit configured to generate additional information to be newly added to the information-added document based on the image data of the original document extracted by the extraction unit, difference information based on a difference between the image data of the original document and image data obtained by the reading unit reading the information-added document, user information of the user who instructed the reading of the original document or the information-added document, and position information used for determining the position of the added information, a transmission unit configured to transmit the image data obtained by the reading unit reading the information-added document and the additional information generated by the generation unit to a designated next operator, a determination unit configured to determine whether position information included in the additional information to be newly added generated by the generation unit and an information-added area based on the position information extracted by the extraction unit overlap, and a notification unit configured to notify a previous operator who is determined based on the extracted user information of the image data based on the original document, the difference information based on the information-added document, and the user information of the user who added the information if the position information and the information-added area are determined by the determination unit to overlap.

According to an exemplary embodiment of the present invention, an image processing apparatus or an image processing method is capable of sending a notification to a previous operator, if a position of a document where the previous operator added information and a position where a subsequent operator added information overlap one another, that information has been added by the subsequent operator, and is also capable of sending information of where the information has been added and information of the subsequent operator.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 10C illustrates an example of image processing performed by the image processing apparatus.

FIG. 10D illustrates an example of image processing performed by the image processing apparatus.

FIG. 12 is a flowchart illustrating an example of an image processing procedure of the image processing apparatus according to a third exemplary embodiment of the present invention.

DESCRIPTION OF THE EMBODIMENTS

Various exemplary embodiments, features, and aspects of the invention will be described in detail below with reference to the drawings.

Figure 1:
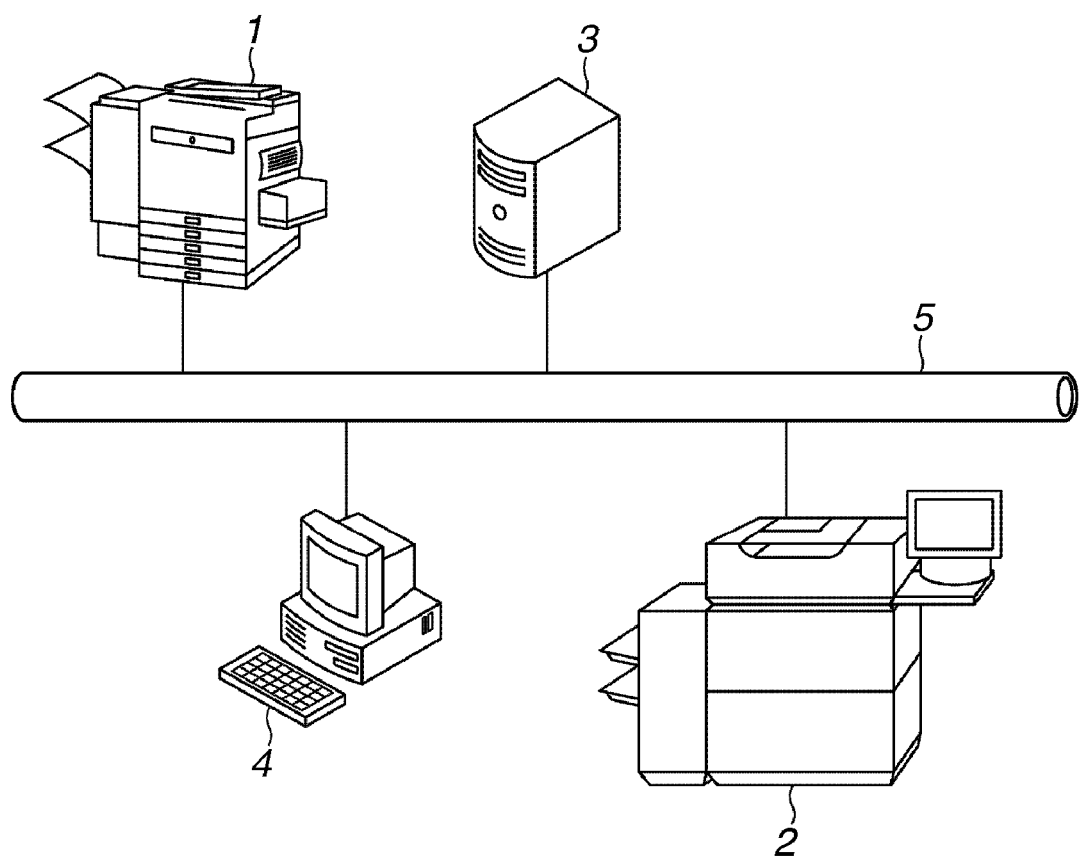
FIG. 1 illustrates an example of a workflow system used for an image processing apparatus according to a first exemplary embodiment of the present invention.

FIG. 1 illustrates an example of a workflow system used for an image processing apparatus according to a first exemplary embodiment of the present invention. The workflow system includes an image processing apparatus 1, an image processing apparatus 2 having a similar function as the image processing apparatus 1, a database/mail server (hereinafter a server) 3, and a client personal computer (PC) 4. All of these apparatuses are mutually connected via a local area network (LAN) 5 such as Ethernet. The image processing apparatus 1 can be also connected to a public line.

In FIG. 1, the image processing apparatus 1 includes a copy function, a facsimile function, a document image scanning function, and a data transmission function for transmitting scanned image data to each apparatus connected to the LAN 5. Further, since the image processing apparatus 1 also includes a Page Description Language (PDL) function and a rendering function, if the image processing apparatus 1 is instructed by a computer connected to the LAN 5 to receive and print a PDL image, the image processing apparatus 1 can receive and print the image as instructed.

Figure 3:
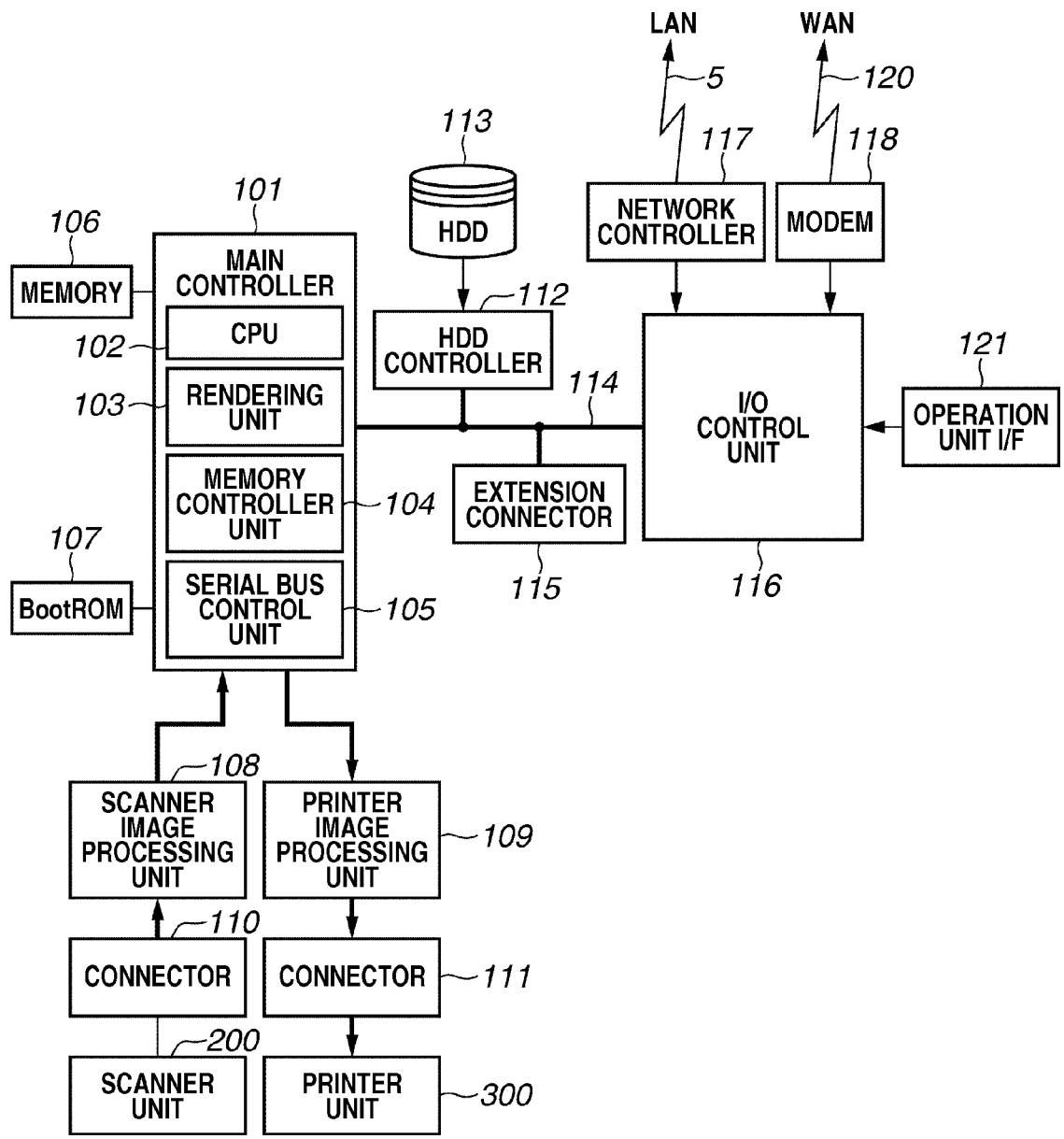
FIG. 3 is a block diagram illustrating a detailed configuration of a controller unit.

Further, the image processing apparatus 1 can store an image obtained by using its scanner function or a PDL image designated by a computer connected to the LAN 5 in a specified region of a hard disk, illustrated in FIG. 3, in the image processing apparatus 1. The image processing apparatus 1 can also print an image stored in a specified region of the hard disk.

Additionally, the image processing apparatus 1 can receive data scanned by the image processing apparatus 2 and transmitted via the LAN 5, store the received data in the hard disk in the image processing apparatus 1, and print the received data. Furthermore, the image processing apparatus 1 can receive the image data transmitted from the server 3 via the client PC 4 and the LAN 5, and store the received data in the image processing apparatus 1 or print the received data.

The server 3 can receive the data scanned by the image processing apparatus 1 via the LAN 5 and stores the received data as a database or transmit the received data to another apparatus by electronic mail. Further, the server 3 performs various data processing operations by a central processing unit (CPU) executing the operating system (OS) or various application programs and executing the application programs under the management of the OS.

The client PC 4 obtains desired data by communicating with the server 3 and displays the obtained data. Further, the client PC 4 receives the data scanned by the image processing apparatus 1 via the LAN 5 and processes and edits the received data. As is the server 3, the client PC 4 performs various data processing operations by a CPU executing the OS or various application programs and executing the application programs under the management of the OS.

Figure 2:
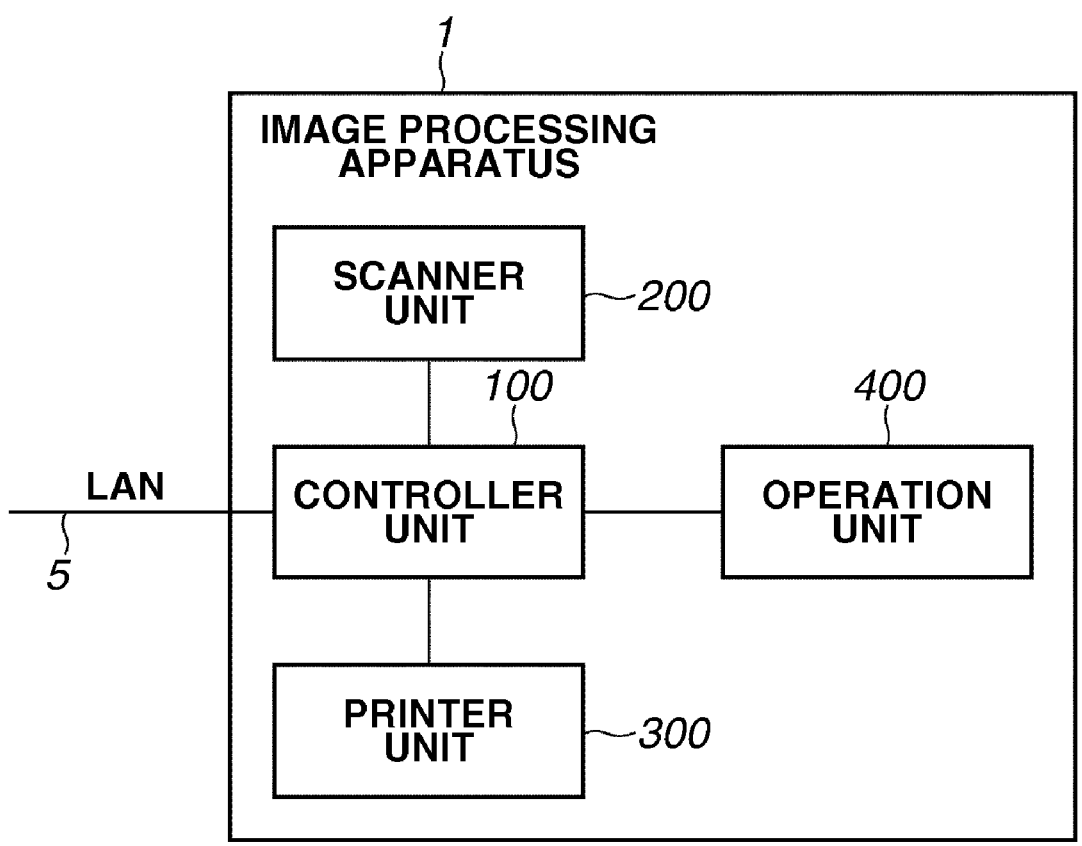
FIG. 2 is a block diagram illustrating a hardware configuration of the image processing apparatus.

FIG. 2 is a block diagram illustrating a hardware configuration of the image processing apparatuses 1 and 2 illustrated in FIG. 1. In FIG. 2, the main units included in the image processing apparatus 1 are a controller unit 100 that controls the whole image processing apparatus, a scanner unit 200 as an image input device, and a printer unit 300 as an image output device.

The controller unit 100 receives an instruction transmitted from an operation unit 400 being a user interface and displays various setting screens. Further, the controller unit 100 is electrically connected to a plurality of processing units such as the scanner unit 200, the printer unit 300, and the operation unit 400, and controls such processing units. Furthermore, the controller unit 100 is connected to the client PC 4 via the LAN 5. The controller unit 100 provides a copy function by controlling the scanner unit 200 to scan image data and further controlling the printer unit 300 to output the obtained image data on a piece of recording paper.

Further, the controller unit 100 provides a scanner function by which the image data obtained by the scanner unit 200 is converted into PDL data, and transmitted to the server 3 via the LAN 5. Further, the controller unit 100 provides a function to convert the image data obtained by the scanner unit 200 into a PDF file and store it as well as a function to transmit the obtained PDF file to a designated destination.

Further, the controller unit 100 provides a function to convert the PDL data sent from the client PC 4 via the LAN 5 into image data and output the image data by the printer unit 300.

The scanner unit 200 includes an image sensor, a scanning drive unit, and a light source turn on/off control unit which are used for optically reading a document image and converting the obtained image into an electrical image signal. According to such units, an electric signal is converted into a luminance signal for R, G, or B color, and the obtained luminance signal is output to the controller unit 100 as image data.

A document is set in the scanner unit 200. When a user instructs the start of the scanning by using the operation unit 400, a document scanning instruction is given from the controller unit 100 to the scanner unit 200.

The printer unit 300 is an image forming device that forms image data received from the controller unit 100 on a sheet of print paper. Although the printer unit 300 uses an electrophotographic method using a photosensitive drum or a photosensitive member belt according to the present embodiment, the present invention is not limited to such a method. For example, an ink jet method that discharges ink from an extremely small nozzle array in printing a sheet can also be used.

The operation unit 400 is used when the user selects an operation which the user desires to operate by key operation. If the operation unit 400 includes a liquid crystal touch panel, the operation unit can be integrally formed with the display unit. The user interface unit is realized by the display unit and the operation unit.

Further, the operation unit 400 includes a user authentication unit (not shown). The user authentication unit can be, for example, a card reader or a biometric authentication unit, or further, an authentication key entry unit. Before using the image processing apparatus, the user uses the user authentication unit to login the image processing apparatus 1. When the user logs in, the image processing apparatus 1 acquires information (user ID) used for identifying a person from the user authentication unit. User information such as a user ID, a mail address, and a user name is stored in the image processing apparatus 1.

The user information is not necessarily stored in the image processing apparatus 1 and, for example, can be stored in the server 3. According to the present embodiment, the user logs in to the image processing apparatus 1, however, the user can also log in to an apparatus other than the image processing apparatus 1 such as the server 3.

FIG. 3 is a block diagram illustrating a detailed configuration of the controller unit 100 illustrated in FIG. 2. In FIG. 3, a main controller 101 includes a CPU 102, a rendering unit 103, a memory controller unit 104, and a serial bus control unit 105.

The CPU 102 operates based on a program stored in a memory 106 and controls the entire operation of the controller unit 100. Further, the CPU 102 interprets the PDL data sent from the client PC 4 and rasterizes the image data according to the program stored in the memory 106. The interpretation of the PDL data is performed by the CPU 102 and rasterization of the image into the raster image data is performed by the rendering unit 103.

The rendering unit 103 generates raster image data based on the PDL data generated by the CPU 102 and transfers the obtained raster image data to the memory 106 or a printer image processing unit 109. The color space of the image data generated by the rendering unit 103 is, for example, RGB or CMYK.

At the serial bus control unit 105, communication with the client PC 4 or various devices is performed via a connector. The serial bus of the serial bus control unit 105 is, for example, Universal Serial Bus (USB), and is used as an interface for receiving PDL data sent from the client PC 4.

In a boot read-only memory (ROM) 107, there is stored a boot program which the CPU 102 uses when it starts. A general-purpose high speed bus 114 connects an extension connector 115 used for connecting an expansion board, an I/O control unit 116, and a hard disk controller 112. A bus used for the general-purpose high speed bus is, for example, PCI bus.

The hard disk controller 112 is used for connecting an external storage unit. According to the present embodiment, a hard disk drive (HDD) 113 is connected to the general-purpose high speed bus 114 via the hard disk controller 112.

The HDD 113 is used for storing a program such as a system software program executed by the CPU 102, image data, attribute data of the image data, and user data.

The workflow according to which a notification mail is transmitted when a difference in a same area is extracted, which is the feature of the present embodiment, is realized by the CPU 102 executing a system software program stored in the HDD 113.

The I/O control unit 116 controls a port and interruption. Further, the I/O control unit 116 is connected to a network controller 117, an operation unit I/F 121, and a modem 118. The modem 118 is also connected to a WAN 120.

The network controller 117 is connected to the LAN 5 being an external network. Generally, a network based on Ethernet is used as this network. The LAN 5 is used when the image processing apparatus receives PDL data sent from the client PC 4, transmits a scanner image, and performs remote management.

The operation unit I/F 121 includes an interface displayed on a liquid crystal screen of the operation unit 400, and a key input I/F used when the user makes various inputs using a hard key or a touch panel key.

The operation unit 400 includes a liquid crystal display device, a touch panel input device provided on the liquid crystal display device, and a plurality of hard keys. A signal entered via the touch panel input device or the hard key is sent to the CPU 102 as an ID number of the hard key and coordinate information of the touch panel entered via the above-described the operation unit I/F 121.

The liquid crystal display device displays the image data transmitted from the operation unit I/F 121. The function used in the operation of the image processing apparatus 1 and the image data are displayed on the liquid crystal display device.

The printer image processing unit 109 is connected to the printer unit 300 via a connector 111. The printer image processing unit 109 corrects, processes, and edits the image data sent from the main controller 101 and performs various image processing operations. The processed image data is sent to the main controller 101 or the printer unit 300.

A scanner image processing unit 108 is connected to the scanner unit 200 via a connector 110. The scanner image processing unit 108 corrects, processes, and edits the image data input via the connector 110 and performs various image processing operations. The processed image data is sent to the main controller 101. The scanner unit 200 is connected to the connector 110 and the printer unit 300 is connected to the connector 111.

Figure 4:
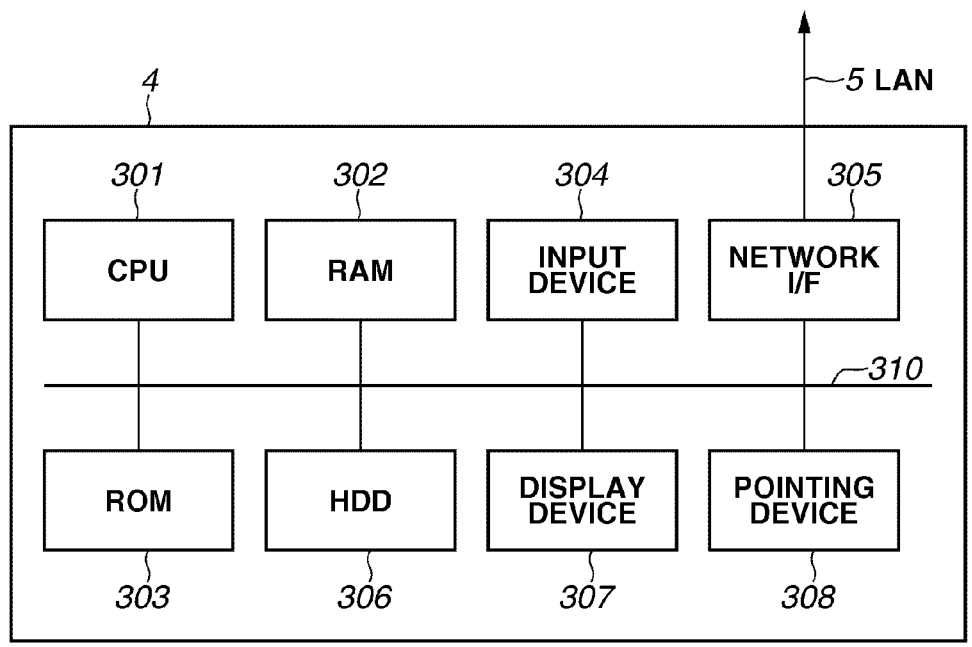
FIG. 4 is a block diagram illustrating a hardware configuration of a server of a client PC.

FIG. 4 is a block diagram illustrating a hardware configuration of the server 3 illustrated in FIG. 1. In FIG. 4, a CPU 301, a random access memory (RAM) 302, a ROM 303, a Network I/F 305, and an HDD 306 are communicably connected to each other via a system bus 310. Further, a display device 307 such as a CRT, an input device 304 such as a keyboard, and a pointing device 308 such as a mouse are also communicably connected to each other via the system bus 310. The hardware configuration of the client PC 4 is similar to that of the server 3 illustrated in FIG. 4.

Figure 5:
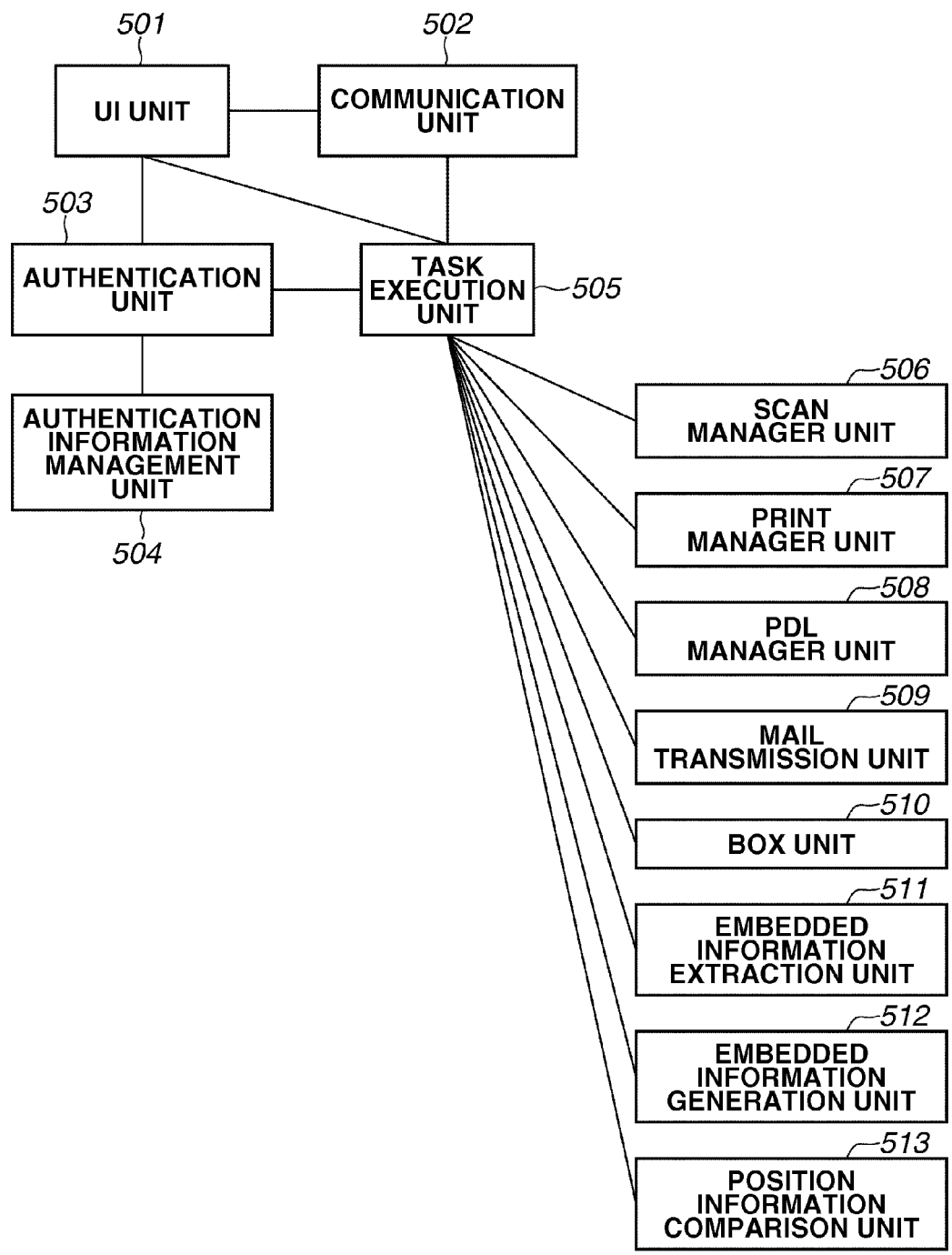
FIG. 5 illustrates a configuration of a software module of the image processing apparatus.

FIG. 5 illustrates a configuration of software modules concerning the control of the various functions (hereinafter referred to as tasks) executable by the image processing apparatus 1 illustrated in FIG. 1. These software modules are stored in the HDD 113 illustrated in FIG. 3 and executed by the CPU 102 of the image processing apparatus 1.

In FIG. 5, a user interface (UI) unit 501 controls the operation unit 400. When the user gives an instruction by using the operation unit 400, the UI unit 501 transmits the instruction to a module of a lower level. Further, the UI unit 501 controls display of information sent from a module of a lower level on the operation unit 400.

A communication unit 502 controls communication between the image processing apparatus and an external apparatus. The communication unit 502 receives instruction or information sent via the LAN 5 and also transmits instruction or information output from the controller unit 100.

A task execution unit 505 receives job information, arranges it, and transmits it to a control manager unit of a lower level so that the task is executed. For example, if the task is "local copy", the task execution unit 505 starts, synchronizes, and completes the processing performed by a scan manager unit 506 and a print manager unit 507.

If the job is a PDL printing job such as LIPS or PostScript, the task execution unit 505 starts, synchronizes, and completes the processing performed by a PDL manager unit 508 and the print manager unit 507.

An embedded information extraction unit 511 separates watermark information included in the image information which is obtained when the scanning task is executed by the scanner unit 200 from the image, and stores it in the HDD 113 as a file.

According to the present embodiment, the embedded information extraction unit 511 decodes additional information added to image data of an original document, and extract the image data of the original document included in the additional information, user information which is information of the user who added information to the original document, and position information where the additional information has been added.

An embedded information generation unit 512 generates a watermark of a file stored in the HDD 113 and synthesizes it with the print image when the print task is executed.

A position information comparison unit 513 compares the position information extracted by the embedded information extraction unit 511 and determines whether the positions overlap each other.

An authentication unit 503 receives login information of the user that operated the operation unit 400 from the operation unit 400 and also receives the user information sent from the communication unit 502. Using the login information and the user information, the authentication unit 503 performs user authentication and manages user operation.

An authentication information management unit 504 manages user authentication information and responds to an inquiry concerning authentication sent from the authentication unit 503.

According to the present embodiment, the image processing apparatus 1 holds the authentication information in the apparatus, however, an authentication server can be arranged and the authentication information can also be managed by that server.

The above-described tasks are generated upon request from the UI unit 501 and the communication unit 502. For example, if the user gives an instruction for copying or scanning a document, a task setting used for the copy task or the scan task is sent from the UI unit 501 to the task execution unit 505. A task sent from the image processing apparatus 2 or the client PC 4 and received by the communication unit 502 is also sent to the task execution unit 505.

A box unit 510 controls writing of information to a box region used for storing information of each operator in the HDD 113 illustrated in FIG. 3. The box unit 510 also controls reading of information from the box region. A mail transmission unit 509 transmits a mail to an operator determined by the user information if the workflow of document revision described below is executed. The user information is extracted by the embedded information extraction unit 511. When the mail transmission unit 509 transmits a mail to the operator, difference information including position information, user information, and image data of the original data is attached to the mail. Here, the position information is information of the information-added areas to which information is added by each operator and is determined to overlap. The determination is made by the position information comparison unit 513. The user information is information of the person who added the information. The mail is not transmitted to the operator who has made mail rejection setting.

Figure 6:
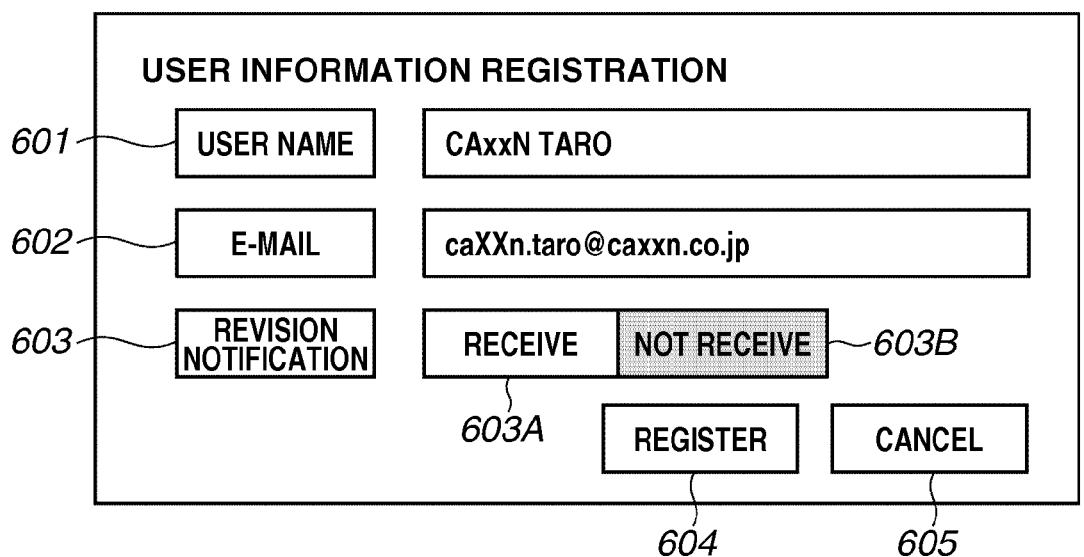
FIG. 6 illustrates an example of a user interface displayed on an operation unit.

FIG. 6 illustrates an example of a user interface displayed on the operation unit 400 illustrated in FIG. 2. The example illustrates a screen which is used when the user information is registered in the authentication information management unit 504. When the user logs in the image processing apparatus 1, if the user information is not registered, the user needs to make registration. This is performed by the user selecting a user registration button (not shown).

In FIG. 6, a user name region 601 is where a name of the login user is displayed. A mail address region 602 is where a mail address is displayed. When an operator inputs a mail address in the mail address region 602 by using a virtual keyboard and selects a registration button 604, the mail address is registered and stored in the HDD 113. The registered mail address is managed by the authentication information management unit 504 as authentication information of the operator.

A notification region 603 is used for setting notification. By selecting either a button 603A or 603B, the operator can determine whether to receive or not receive notification if information is manually added by the subsequent operator to the document. In other words, if the button 603A is selected by the operator, on condition that the position information comparison unit 513 determines that the area where information is newly added by the subsequent operator overlaps an area where information has already been added by a previous operator, the operator can receive the added information.

The information that the operator receives includes difference information of image data, user information, and position information that can be used in determining the information-added position. The difference information of image data indicates the difference between corresponding image data of the original document and the information-added document. The operator selects the button 603A when the operator desires to receive the notification. The operator selects the button 603B when the operator does not desire to receive the notification. In this way, each operator can select whether to receive or not receive notification when a subsequent operator has added information to a same area in the information-added document.

The user who desires to receive the notification that information has been added by a subsequent operator selects the button 603A. When the button 603A is selected, if a subsequent operator adds information to a same area, a mail is transmitted to the registered mail address from the image processing apparatus 1. On the other hand, the user who does not desire to receive such a notification will not have the mail transmitted from the image processing apparatus 1 even if a subsequent operator adds information to the same area.

First, a user being the origin of the revision workflow outputs a document using the client PC 4 and the image processing apparatus 1. The user generates a document using an application program of the client PC 4 and then prints the document using a printer driver of the image processing apparatus 1. In this way, an original document before the revision is printed.

Next, a revision workflow which is used by a user, being the origin of the workflow, when the user passes on a revised information-added document to a next operator using the image processing apparatus 1 will be described.

Figure 7:
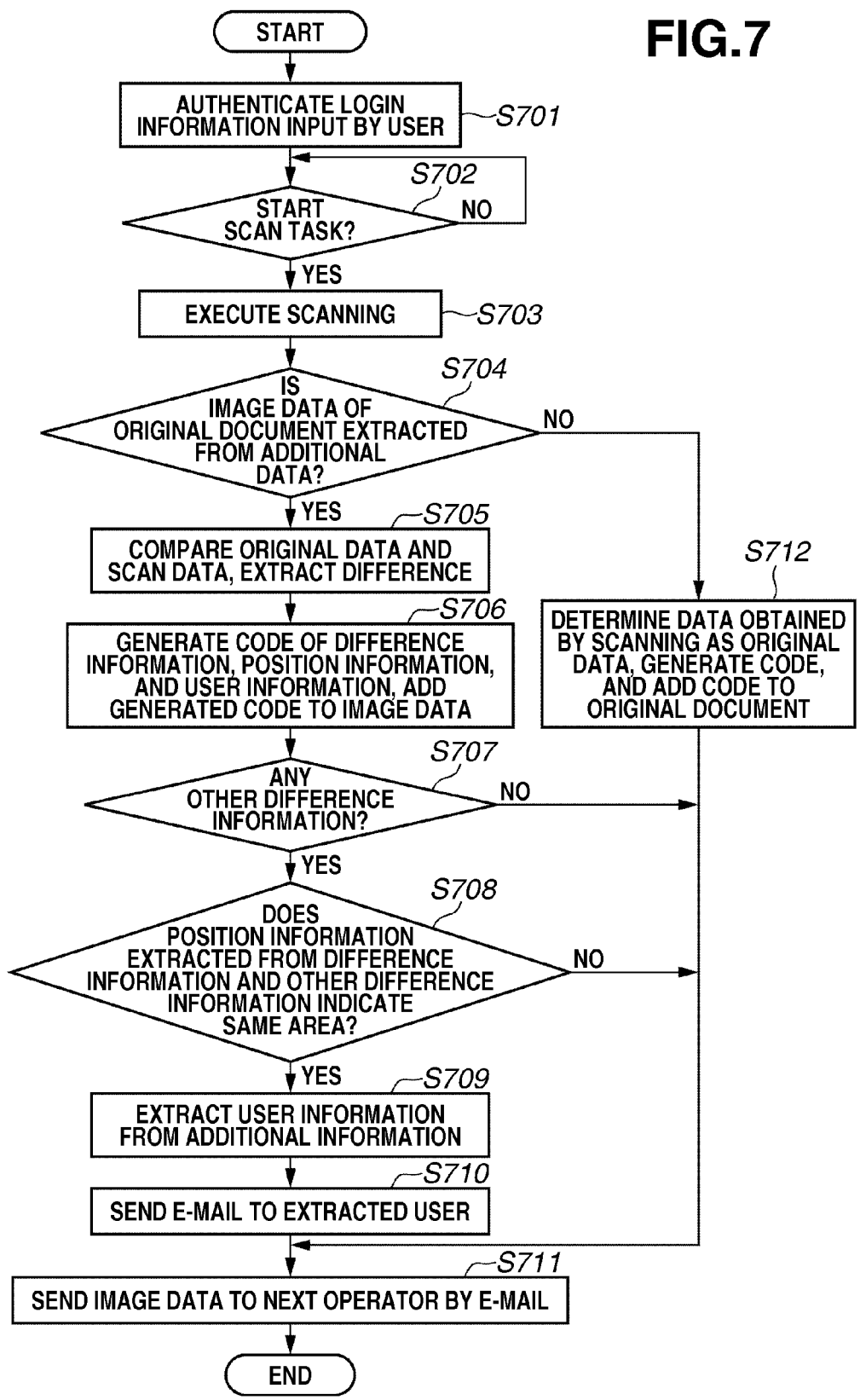
FIG. 7 is a flowchart illustrating an example of an image processing procedure of the image processing apparatus.

FIG. 7 is a flowchart illustrating an example of an image processing procedure of the image processing apparatus according to the present embodiment. The example is a workflow example where a document is revised by each operator. Each step in the flowchart is realized by the CPU 102 loading the task execution unit 505 stored in the HDD 113 and illustrated in FIG. 5 into the memory 106 and executing it.

In step S701, the image processing apparatus 1 is first at standby and the screen used for login (not shown) is displayed on the operation unit 400. When the user enters login information using the operation unit 400, the information is sent to the UI unit 501, and the authentication unit 503 authenticates the user. If the authentication performed by the authentication unit 503 is successful, the process proceeds to step S702. If the authentication fails, then the process is repeated.

Figure 8:
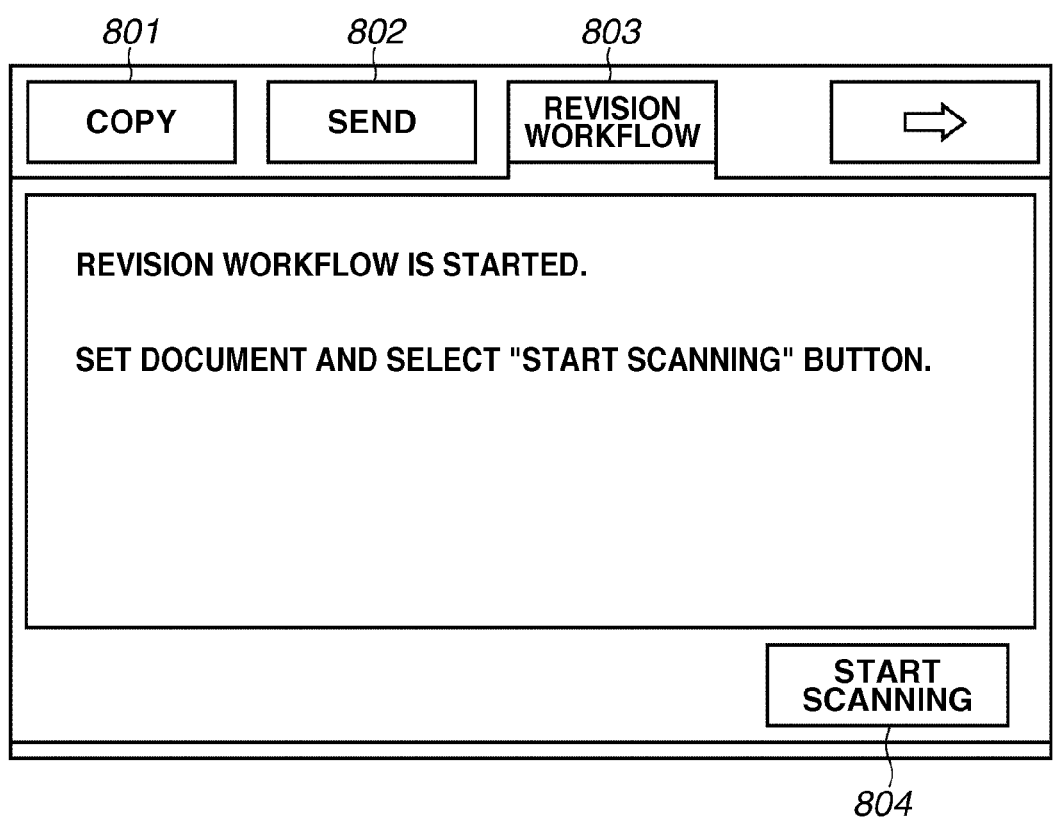
FIG. 8 illustrates an example of a user interface displayed on the operation unit.

In step S702, after the user logs in the image processing apparatus 1, the image processing apparatus 1 displays a graphical user interface (GUI) screen illustrated in FIG. 8 on the operation unit 400.

FIG. 8 illustrates an example of a user interface displayed on the operation unit 400 illustrated in FIG. 2. In FIG. 8, buttons 801, 802, and 803 are buttons used for changing the application of the image processing apparatus 1.

The button 801 is selected when the user starts the copy task. The button 802 is selected when the user starts the transmission task. The button 803 is selected when the user starts the revision workflow task. If the button 803 is selected, a screen for setting the revision workflow task is displayed.

A button 804 is selected when the user starts scanning a document (i.e., original document or information-added document) set on the scanner unit 200. A login user sets a document to be circulated on the scanner unit 200 according to the revision workflow and selects the button 804. When the button 804 is selected, the display of the operation unit 400 is changed to the UI screen illustrated in FIG. 9 according to a display control performed by the controller unit 100.

Figure 9:
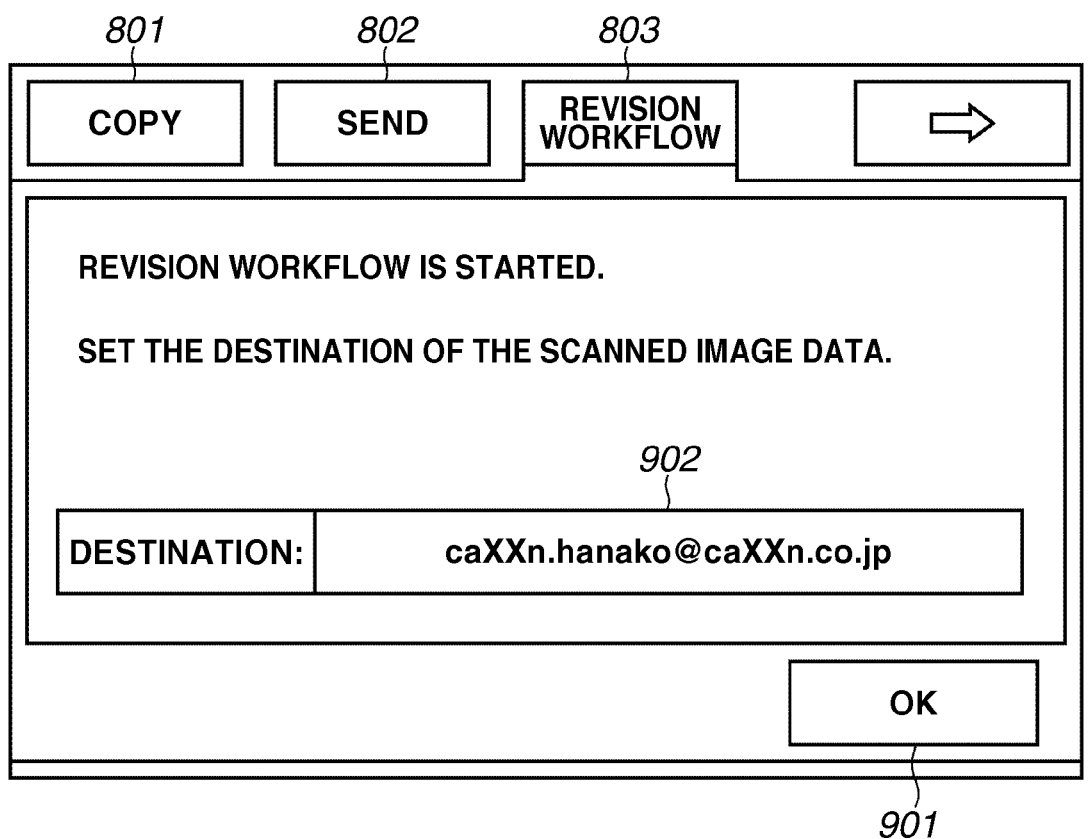
FIG. 9 illustrates an example of a user interface displayed on the operation unit.

FIG. 9 illustrates an example of a user interface displayed on the operation unit 400 illustrated in FIG. 2. The example illustrated in FIG. 2 is a case where a destination setting screen is displayed. Although the following description is based on a case where one destination is set, a plurality of destination 902 may also be set. Further, the destination is not limited to a mail address and may also be a path to a certain folder. Further, the destination can be read from an address book of the image processing apparatus 1 or the user can directly enter the destination.

A button 901 is selected when the user determines the destination set for the destination 902. The document scanned by the scanner unit 200 can be either the original document or an information-added document which includes handwritten information added by a subsequent operator.

In step S702, after the login user sets the destination of the next processing person, the controller unit 100 determines whether the button 901 illustrated in FIG. 9 is selected. If the controller unit 100 determines that the button 901 is selected (YES in Step S702), the process proceeds to step S703.

In step S703, the task execution unit 505 sets the scan task that extracts the embedded information, and the scanner unit 200 scans the document. The image data obtained by the scanning performed by the scanner unit 200 is temporarily stored in the HDD 113.

In step S704, from the image data obtained according to the scanning performed by the scanner unit 200 in step S703, the task execution unit 505 determines whether the embedded information extraction unit 511 can extract the original data embedded in the additional information which is added to the document. If the task execution unit 505 determines that the original data is not embedded (NO in step S704), the process proceeds to step S712. If the original data is not embedded in the additional information, it means that the document which the scanner unit 200 scanned is the original document.

In step S712, the embedded information generation unit 512 receives the image data stored in the HDD 113 in step S703 (i.e., image data of the original document) and generates additional information to be added to the original document. A two-dimensional barcode is generated, for example, as the additional information. Although the two-dimensional barcode is a QR code according to the present embodiment, a different type of barcode may also be used.

Figure 10A:
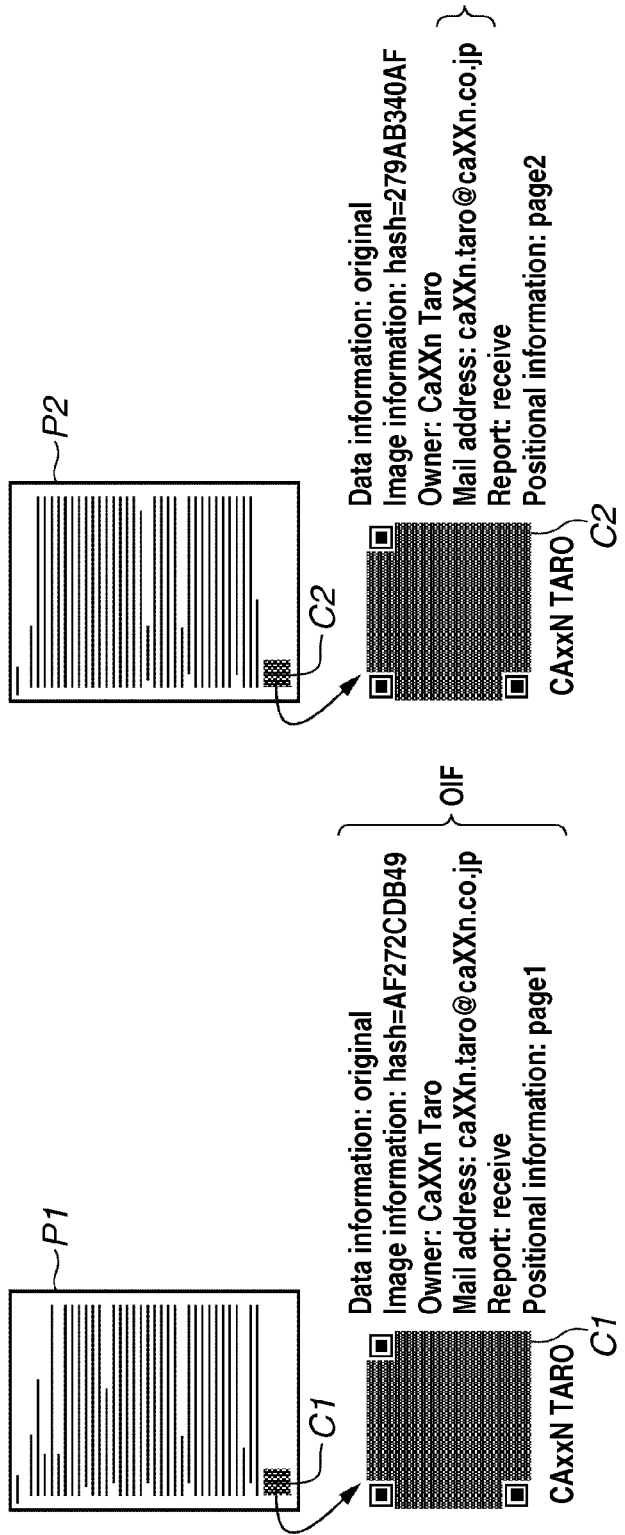
FIG. 10A illustrates an example of image processing performed by the image processing apparatus.

FIGS. 10A to 10D illustrate examples of image processing according to the document revision workflow performed by the image processing apparatus according to the present embodiment. FIG. 10A illustrates image data based on an original document and additional information (e.g., two-dimensional barcode) embedded in the original document.

In FIG. 10A, image data P1 includes additional information C1 and image data P2 includes additional information C2. The additional information C1 and C2 is generated from image data obtained by scanning the original document and user information of the user that instructed the scanning of the original document.

The embedded information generation unit 512 receives the user information such as a name or a mail address of the user from the authentication unit 503. Further, the embedded information generation unit 512 receives position information of the image data of the original document by using a method, for example, discussed in Japanese Patent Application Laid-Open No. 2004-246577. Furthermore, the additional information C1 and C2, which is generated by the embedded information generation unit 512, is added to the image data obtained by scanning in step S703.

According to the present embodiment, the generated additional information is described as a two-dimensional barcode, however, it is not necessarily a two-dimensional barcode and, for example, a digital watermark may also be used.

Further, the data embedded as the image data of the original document can be any type of data so long as it can be used to determine whether information has been added. The data embedded as the image data of the original document may be the image data itself or a hash value generated according to a hash function such as MD5 or Secure Hash Algorithm-2 (SHA-2). MD5 is an abbreviation of Message Digest Algorithm 5.

According to the present embodiment, the two-dimensional barcode generated as additional information by the embedded information generation unit 512 includes a hash value of the image data of the original document, personal data (name and mail address), report receive/not receive information (whether change information is received/not received by mail), and position information. The position information is page information according to the present embodiment, however, as described below, it may also be position information indicating whether areas to which information has been added by operators overlap.

Further, the embedded information generation unit 512 generates two-dimensional barcode of the image data and position information of the image data of the original document. The registered user name and mail address illustrated in FIG. 6 are added to the document as readable information. According to the example of readable information illustrated in FIG. 10A, the name of the creator of the original data is given in a readable text below the additional information C1 and C2 (two-dimensional barcodes). According to this text, the subsequent operator is able to know who has revised the document by adding information to the original document or to the information-added document.

In step S704, if the task execution unit 505 determines that the image data of the original document is embedded in the additional information (YES in step S704), the process proceeds to step S705.

In step S705, the image data of the original document extracted by the embedded information extraction unit 511 is compared with the image data which is obtained by the scanner unit 200 scanning the document and stored in the HDD 113 in step S703, and difference information is extracted. The data can be compared by using a publicly known method which compares the data page by page or object by object. However, different techniques may also be used in the comparison.

The present embodiment does not depend on the type of the comparison technique and any type of method can be used so long as the image data can be compared and the difference information concerning position difference can be extracted.

The difference information extracted by a comparison of the image data is converted into additional information C3 in the form of two-dimensional barcode by the embedded information generation unit 512 together with the position information and user information. Then, the embedded information generation unit 512 adds the generated additional information C3 to the scanned image data.

Figure 10B:
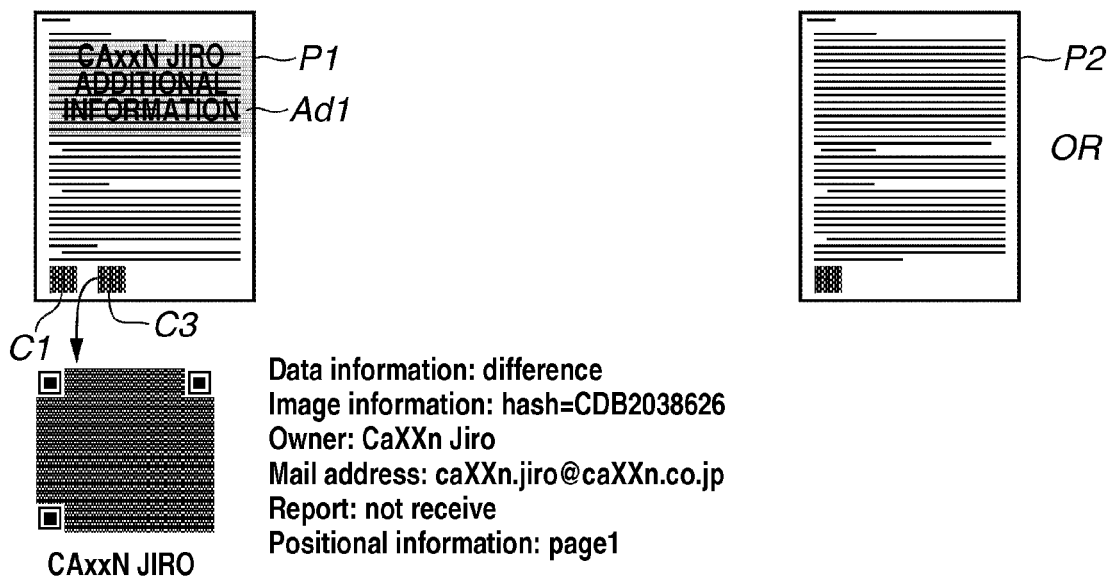
FIG. 10B illustrates an example of image processing performed by the image processing apparatus.

FIG. 10B illustrates the image data obtained by scanning the image data after information is added to an area Adl. Further, additional information C3 is added to the image data. In FIG. 10B, the name of the operator that added information to the image data P1 is indicated in a readable text. Since new information is not added to the image data P2, only the additional information C2 is added to the original data.

In step S707, the embedded information extraction unit 511 determines whether additional information being other difference information including information other than the original data is included in the image data obtained by the scanning in step S703.

If the embedded information extraction unit 511 determines that additional information including other difference information is not included (NO in step S707), then the process proceeds to step S711. In step S711, the image data to be added, which has been generated in step S706, is transmitted to the operator who is to perform the next revision. The image data is attached to a mail transmitted to the operator. Then the process ends.

On the other hand, in step S707, if the embedded information extraction unit 511 determines that a two-dimensional barcode including other difference information is included in the image data (YES in step S707), the process proceeds to step S708. In step S708, the embedded information extraction unit 511 extracts position information from the additional information including the other difference information. Then, the position information comparison unit 513 determines whether the position information which is extracted this time overlaps the position information generated in step S706. For example, in the case of the image data illustrated in FIG. 10D, the position information comparison unit 513 determines that additional information C5 and the additional information C3 include the same position information, and further, additional information C6 and additional information C4 include the same position information.

If the position information comparison unit 513 determines that the position information does not overlap (NO in step S708), then the process proceeds to step S711. In step S711, the image data to be added, which is generated in step S706, is transmitted to the operator who is to perform the next revision. The image data is attached to a mail transmitted to the operator.

On the other hand, in step S708, if the position information comparison unit 513 determines that the position information overlaps (YES in step S708), the process proceeds to step S709. In step S709, the embedded information extraction unit 511 extracts the user information from the additional information including the position information. When the extraction of the user information is completed, the process proceeds to step S710.

In step S710, the image data generated in step S706 is attached to a mail and sent to the user whose position information of the difference information is determined to overlap and determined from the user information extracted in step S709. At this time, if the mail transmission unit 509 receives a same destination a plurality of times from the embedded information extraction unit 511, the mail transmission unit 509 arranges the data so that it can be sent in a single mail. For example, if a user who has made revision by adding information to a plurality of areas in a document receives revised information from a subsequent operator that also made revisions, the user does not receive information for each information-added area but receives information by the document unit.

For example, if the document is what is illustrated in FIG. 10D, the creator of the original document does not receive image data P1 and P2 separately but receives the image data as one document. After the processing is executed, the process proceeds to step S711.

In step S711, the image data generated in step S706 is attached to a mail transmitted to the destination which the user that logged in the image processing apparatus 1 in step S702 set as the destination, and then the process ends.

If the added information is as illustrated in FIGS. 10B and 10C, the positions of the added information in FIGS. 10B and 10C overlap only the image data of the original document. Thus, the mail is transmitted to only the creator (operator) of the original document. Image data of the information-added document is sent to the next processing person.

As described above, the revision workflow is realized by each operator adding information to a printed document by using an image processing apparatus. According to this workflow, an information-added document is scanned by a scanner unit, and the information-added document is passed on to the next operator and processed.

According to the present embodiment, regarding a revision workflow where an operator adds information to an original document or an information-added document and passes the document which includes the information added by the operator to the next operator, the following effect can be achieved.

According to the present embodiment, if an operator (previous operator) adds information to a certain area and another operator (subsequent operator) adds information to the same area at a later time, the previous operator can obtain and confirm the information added by the subsequent operator regardless of whether the document is an original document of an information-added document. The previous operator can receive added information which includes position information, content information, and user information. The position information is information of where the information has been added. The content information is information of the content of the added information. The user information is information of the user who added the information.

According to the above-described first exemplary embodiment, the user that logs in makes the transmission setting for the next processing person. However, the workflow information may be defined in advance. According to a second exemplary embodiment of the present invention, the workflow information is defined in advance. An example where the workflow information is set in the additional information added to the original document or the information-added document which is scanned by the scanner unit 200 will now be described.

Figure 11:
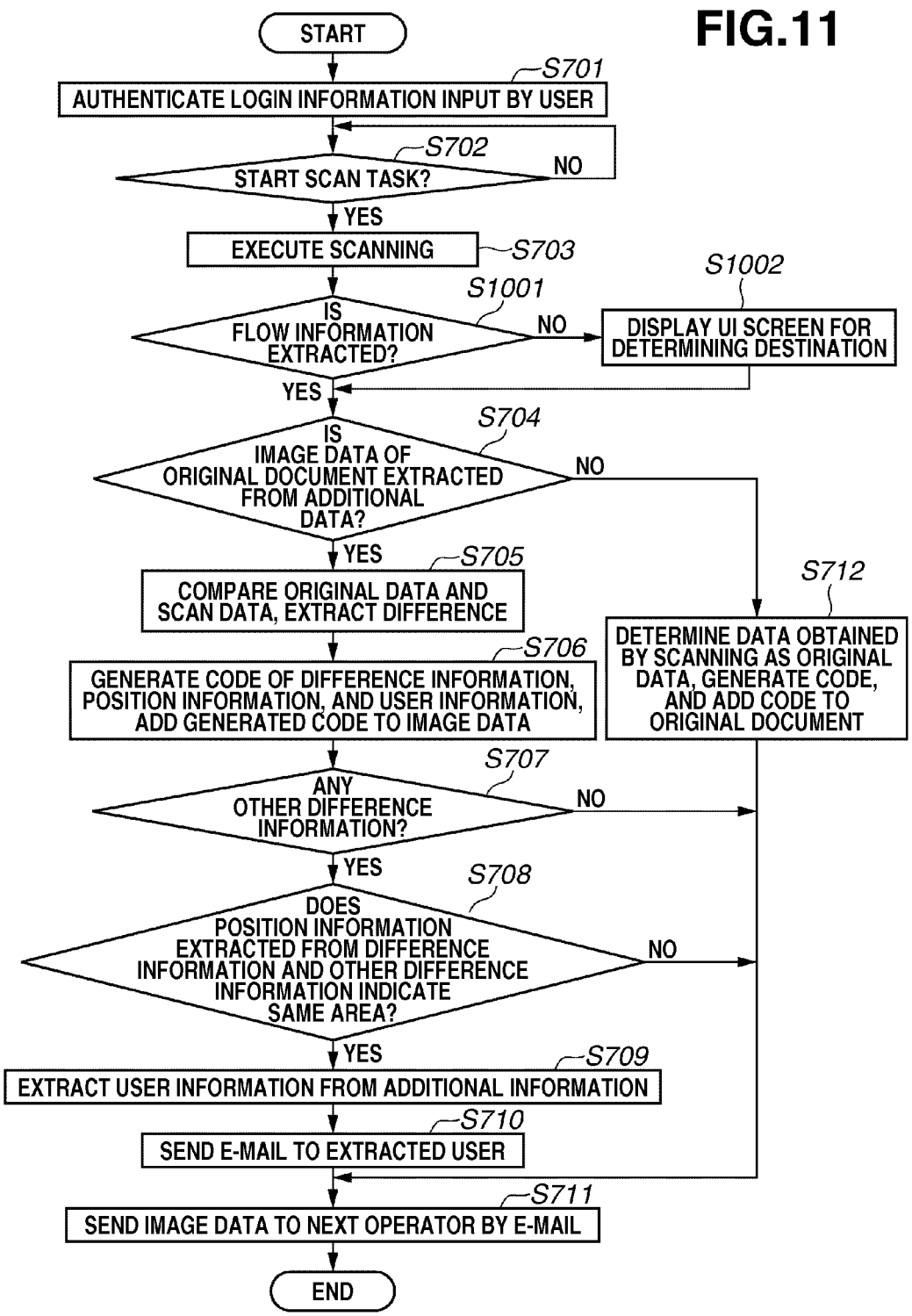
FIG. 11 is a flowchart illustrating an example of an image processing procedure of the image processing apparatus according to a second exemplary embodiment of the present invention.

FIG. 11 is a flowchart illustrating an example of an image processing procedure of the image processing apparatus according to the second exemplary embodiment of the present invention. The flowchart illustrates a case where an original document or an information-added document is processed when the workflow information is defined in advance. Each step in the flowchart is realized by the CPU 102 loading the task execution unit 505 illustrated in FIG. 5 and stored in the HDD 113 into the memory 106 and executing it. Description of the steps same as steps S701 to S712 in FIG. 7 is omitted.

In step S702, if the user selects the button 804 displayed on the UI screen illustrated in FIG. 8 to start the scanning operation of the scanner unit 200, the process proceeds to step S703.

In step S703, the original document or the information-added document is scanned by the scanner unit 200, and the process proceeds to step S1001. In step S1001, the embedded information extraction unit 511 determines whether workflow information is extracted from the data obtained by the scanning.

In step S1001, if the embedded information extraction unit 511 determines that the flow information is extracted (YES in step S1001), the destination is set according to the extracted information, and the process proceeds to step S704 as is with the first exemplary embodiment.

According to the present embodiment, the workflow information is information including circulation order according to which each operator forwards the information-added document (revision document) and destination information of each operator. The workflow information is set when an operator (user) being the source of the workflow generates the revision document and prints it.

Further, the workflow information is converted into, for example, a two-dimensional barcode (additional information) by a printer driver of the image processing apparatus 1. When the printer unit 300 prints the information-added document, the two-dimensional barcode is added to a predetermined position of the information-added document.

In step S1001, if the embedded information extraction unit 511 determines that the workflow information is not extracted (NO in step S1101), the process proceeds to step S1002. In step S1002, the UI screen illustrated in FIG. 9 is displayed on the operation unit 400. Then, a destination set by the operator using the UI screen is determined as the destination of the scanned data. After the destination is set via the UI screen illustrated in FIG. 9, if the button 901 is determined as selected, the process proceeds to step S704. Description of steps S704 and later is omitted since the processes in the steps are similar to those described in the first exemplary embodiment.

The task flow when the workflow information is embedded in a document scanned by the scanner unit 200 of the image processing apparatus 1 is executed as described above. According to the present embodiment, when an operator adds information to an original document or an information-added document and passes the document which includes the information added by the operator to the next operator, since the workflow information is embedded in the document in advance, the workflow can be processed without the subsequent operator setting the destination, and thus convenient.

FIG. 12 illustrates an example of image processing based on revision workflow of a document of the image processing apparatus according to a third exemplary embodiment of the present invention. Unlike the information-added document illustrated in FIG. 10A, the example illustrates a case where a plurality of overlapping areas exist in the areas where the operators added information.

In FIG. 12, additional information (1) to (3) includes a two-dimensional barcode generated by the embedded information generation unit 512 as is with the first exemplary embodiment.

In FIG. 12, an original document OR is obtained by operator A executing an application using an information processing apparatus and using the printer unit 300 of the image processing apparatus 1. Operator A sets the original document OR on the scanner unit 200 after selecting the button 803 of the user interface screen displayed on the operation unit 400 of the image processing apparatus 1 illustrated in FIG. 8.

Since the document described here is a single-page document, operator A sets one sheet of paper on a document positioning plate. However, if the document contains a plurality of sheets, an automatic document feeding device (not shown) may also be used.

Next, if operator A selects the button 804 illustrated in FIG. 8, the scanner unit 200 starts scanning the document. Before the scanning is performed, operator A enters user information used for the login to the image processing apparatus 1 and the authentication unit 503 executes the authentication processing.

Further, according to the example illustrated in FIG. 12, an original document OR and information-added documents AD1, AD1', AD2, and AD2' are forwarded to the next operator starting from operator A to operator C. Further, as described above, additional information (1) to (3) is added to the documents. Information AB is information added by the operator B and information AC is information added by operator C. Difference information A-B is difference information of operator B and difference information A-B-C is difference information of operator C.

(Document Forwarded from Operator A to B and Revision Processing)

After the login to the image processing apparatus 1 is completed, operator A sets the original document OR in the image processing apparatus 1 and starts the revision workflow. Then, operator A selects the button 804 displayed on the user interface screen illustrated in FIG. 8.

Next, the embedded information generation unit 512 generates additional information based on the user information of operator A and the content of image data which the scanner unit 200 scanned from the original document OR, and position information that indicates the image area of the document. At this time, if a different operator executes revision by adding information to the original document OR, additional information may be generated based on the information that determines whether the revision notification is to be received to not.

In this way, the original document OR and its additional information (1) is transmitted from operator A to operator B or to a BOX region of the operator B held in the image processing apparatus 1 via the communication unit 502. At the same time, the image processing apparatus 1 sends out a notification to operator B that the information-added document AD1 which needs to be checked by operator B is transmitted from operator A.

Then, operator B prints the information-added document AD1 stored in the BOX region set for operator B by using the printer unit 300 of the processing apparatus 1. Thus, operator B obtains the information-added document AD1 as a paper document.

If operator B adds the information AB to the information-added document AD1 being a paper document by handwriting, the information-added document AD1 will be information-added document AD1'. According to the example illustrated in FIG. 12, the information AB, which is handwritten by operator B, is written over the image area of the information-added document AD1 generated by operator A.

Then, operator B logs in the image processing apparatus 1 and instructs the scanner unit 200 to scan the information-added document AD1'. According to this instruction, the scanner image processing unit 108 generates the difference information A-B by comparing the image data which the scanner unit 20 obtained by scanning the information-added document AD1' with image data generated from the additional information (1) which is added to the information-added document AD1'.

Further, the embedded information generation unit 512 generates additional information (2), which is to be transmitted to operator C, based on the user information which operator B entered at the time of login and the image data which the scanner unit 20 obtained by scanning the information-added document AD1'. Then, the communication unit 502 transmits the generated additional information (2) and the image data which the scanner unit 20 obtained by scanning the information-added document AD1' to operator C.

Further, the position information comparison unit 513 compares the image data generated from the additional information (1) with the image data which the scanner unit 20 obtained by scanning the information-added document AD1', and determines whether the images overlap. If the images are determined to overlap, the coordinate position of the overlapping area is determined by image processing. According to this determination, the position information of the area where operator B added information is generated.

Further, the mail transmission unit 509 transmits the image data generated from the additional information (1), the generated additional information (2), and the information AB to operator A by attaching the image data and information to a mail.

According to the transmitted mail, operator A is able to know that information has been added by operator B to the document which operator A processed and can determine the area where the information has been added.

(Document Forwarded from Operator B to C and Revision Processing)

Transmission processing from operator B to operator C is similar to the transmission processing between operators A and B described above.

However, when operator B transmits the information-added document AD2 from the image processing apparatus 1 to the next operator C, the additional information (2) generated by the embedded information generation unit 512 is newly added. Then, according to the instruction given by operator C that logs in to the image processing apparatus 2, the information-added document AD2 is printed.

The difference between the information-added document AD1 and the information-added document AD2 is that the additional information (2) and the information added by operator B is printed on the information-added document AD2. Then, operator C adds information to the information-added document AD2. Accordingly, an information-added document AD2' is generated. After then, operator C performs operation for transmitting the information-added document AD2' to operator D.

At this time, the position information comparison unit 513 determines the area where operator C added information and the position information is determined. Further, the embedded information generation unit 512 generates the additional information (3) of operator C. Then, the mail transmission unit 509 transmits the image data generated from the additional information (1), the generated additional information (2) and (3), and the information AB and AC to operators A and B by attaching the image data and information to a mail.

In this way, the original document and an information-added document, which is a document based on the original document but has information added by subsequent operators, are generated. The scanning and the printing operations are performed by the image processing apparatuses 1 and 2, and the paper document is passed on to the next operator.

Additionally, if an area of the information added by the subsequent operator is determined to overlap the area of the information added by a previous operator, the position information of the overlapping area and the information of the operator who added the information is notified by a mail. Thus, the previous operator is able to track and confirm who has added information to which area.

According to the above-described exemplary embodiments, regarding a document revision workflow realized by a plurality of operators, even if an operator adds information to a document and another operator further adds information to the same area, it is possible to know the content (the position, the image, and the user) of the information which the other operator added. Further, since all information can be embedded in a paper document, a workflow that does not depend on a server can be realized. Further, a plurality pieces of difference information can be embedded in an information-added document.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-022317 filed Feb. 3, 2009, which is hereby incorporated by reference herein in its entirety.

What is claimed is:

1. An image processing apparatus having a reading unit for reading and processing an original document or an information-added document based on the original document and having information added by each operator, the image processing apparatus comprising:
   an authentication unit configured to authenticate a user that instructs reading of the original document or the information-added document to the reading unit;
   a decoding unit configured to decode additional information added to the information-added document read by the reading unit;
   an extraction unit configured to extract image data of the original document, user information of a user who added information to the original document or the information-added document, and position information used for determining a position where information is added to the original document from the additional information decoded by the decoding unit;
   a generation unit configured to generate additional information to be newly added to the information-added document based on the image data of the original document extracted by the extraction unit, difference information based on a difference between the image data of the original document and image data obtained by the reading unit reading the information-added document, user information of the user who instructed the reading of the original document or the information-added document, and position information used for determining the position of the added information;
   a transmission unit configured to transmit the image data obtained by the reading unit reading the information-added document and the additional information generated by the generation unit to a designated next operator;
   a determination unit configured to determine whether position information included in the additional information to be newly added generated by the generation unit and an information-added area based on the position information extracted by the extraction unit overlap; and
   a notification unit configured to notify a previous operator who is determined based on the extracted user information of the image data based on the original document, the difference information based on the information-added document, and the user information of the user who added the information if the position information and the information-added area are determined by the determination unit to overlap.

2. The image processing apparatus according to claim 1, further comprising a printing unit configured to print image data transmitted from the transmission unit and a document to be processed by the next operator based on the additional information,
   wherein the reading unit reads the information-added document whose information is added by the next operator to the document printed by the printing unit.

3. The image processing apparatus according to claim 2, wherein the information added by the next operator is manually-written information.

4. The image processing apparatus according to claim 1, wherein the additional information is a two-dimensional barcode.

5. The image processing apparatus according to claim 1, wherein the additional information includes information of whether to permit or reject receipt of the notification sent from the notification unit.

6. The image processing apparatus according to claim 1, wherein the additional information includes information determining an operator to which the additional information is to be transmitted.

7. The image processing apparatus according to claim 1, wherein the notification unit notifies that information is added to a plurality of pages in a collective manner.

8. An image processing method for an image processing apparatus having a reading unit for reading and processing an original document or an information-added document based on the original document and having information added by each operator, the method comprising:
   authenticating a user that instructs reading of the original document or the information-added document to the reading unit;
   decoding additional information added to the information-added document read by the reading unit;
   extracting image data of the original document, user information of a user who added information to the original document or the information-added document, and position information used for determining a position where information is added to the original document from the decoded additional information;
   generating additional information to be newly added to the information-added document based on the image data of the original document, difference information based on a difference between the image data of the original document and image data obtained by the reading unit reading the information-added document, user information of the user who instructed the reading of the original document or the information-added document, and position information used for determining the position of the added information;
   transmitting the image data obtained by reading the information-added document and the generated additional information to a designated next operator;
   determining whether the generated position information included in the additional information to be newly added and an information-added area based on the extracted position information overlap; and
   notifying a previous operator who is determined based on the user information of the image data based on the original document, the difference information based on the information-added document, and the user information of the user who added the information if the position information and the information-added area are determined to overlap.

9. The image processing method according to claim 8, further comprising:

printing the transmitted image data and a document to be processed by the next operator based on the additional information; and reading the information-added document whose information is added by the next operator to the printed document.

10. The image processing method according to claim 9, wherein the information added by the next operator is manually input information.

11. The image processing method according to claim 8, wherein the additional information is a two-dimensional barcode.

12. The image processing method according to claim 8, wherein the additional information includes information of whether to permit or reject receipt of the notification.

13. The image processing method according to claim 8, wherein the additional information includes information determining an operator to which the additional information is to be transmitted.

14. The image processing method according to claim 8, further comprising notifying that information is added to a plurality of pages in a collective manner.

15. A non-transitory computer-readable storage medium storing a program for causing a computer to execute the image processing method according to claim 8.

* * * * *